July 27, 1937.  W. C. NEIN  2,087,987
MAXIMUM DEMAND WATTHOUR METER SEAL AND RESET DEVICE.
Filed July 12, 1934
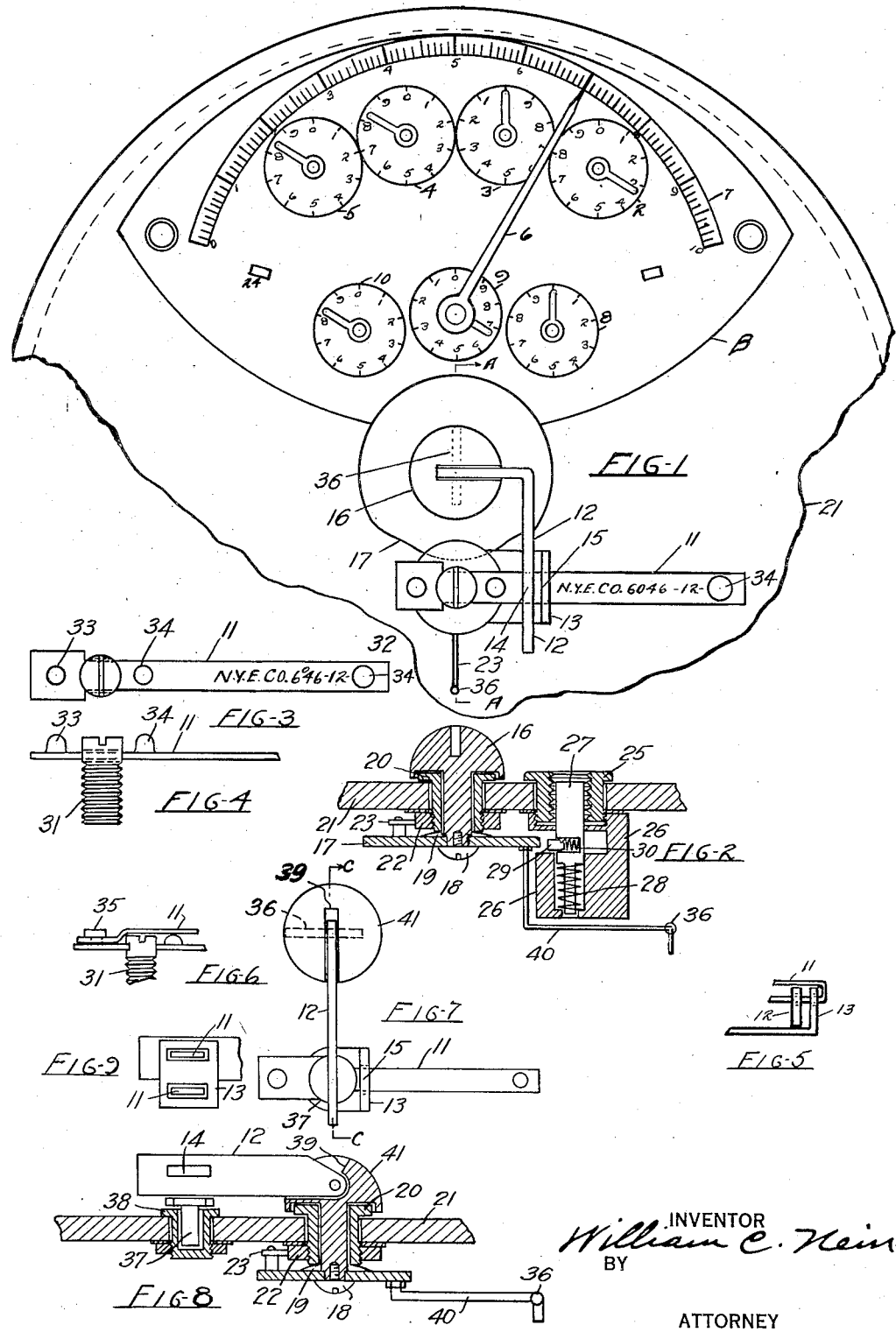
INVENTOR
William C. Nein
BY
ATTORNEY Patented July 27, 1937

2,087,987

UNITED STATES PATENT OFFICE 2,087,987

MAXIMUM DEMAND WATT-HOUR METER SEAL AND RESET DEVICE

William C. Nein, White Plains, N. Y., assignor to Sangamo Electric Co., a corporation of Illinois Application July 12, 1934, Serial No. 734,719

3 Claims. (Cl. 171—34)

This invention relates to watthour meters having maximum demand registers with indicating pointer; or accumulative demand dials, with indicating pointer; or integrating demand dials with reset or indicating pointer.

The main object of this invention is to provide a means which will give positive assurance that the meter reader, after noting or recording the maximum demand reading on the meter scale or dial, will reset the indicating or demand pointer to the zero position as he should in order to continue the proper operation of the meter for the next meter reading period.

Other objects and advantages of the invention will be apparent from the following description and from a reference to the drawing.

Referring to the drawing:

Fig. 1 shows a partial plan view of the invention applied to an integrating demand watthour meter.

Fig. 2 shows a sectional view of the invention along the line A, A, of Fig. 1.

Fig. 3 shows a plan view of part of Fig. 1.

Fig. 4 shows an elevation view of Fig. 3.

Fig. 5 shows just how the seal is closed or sealed.

Fig. 6 shows a part of the reset lever with support to which it is sealed.

Fig. 7 shows a plan view of another form of the invention.

Fig. 8 shows a section view of Fig. 7 along line C, C.

Fig. 9 shows a side view of a detail of Fig. 8.

Referring again to the drawing:

Fig. 1 shows a well known watthour meter maximum demand register the upper dials of which record the number of kilowatt hours of electrical energy which have passed thru the meter; the pointer and scale of which indicate the maximum demand in kilowatts for a given time interval, usually 30 minutes, over a previously agreed upon period, usually one month; and the lower dials of which record kilowatts demand coincident with the movement of the maximum demand indicating pointer; in fact the meter drives the pointer and the pointer drives the lower dials whose total is left undisturbed when the pointer is restored to zero and whose totals are known as integrated demand. The lower portion of the figure shows a lever and seal arrangement; the lever to be used in restoring the indicating pointer to zero in order to begin a new demand period and the seal to prevent unauthorized persons from tampering with the lever. The dotted lines represent a portion of the usual glass cover of the meter in whose face is mounted the pointer restoring lever and lever seal as is shown more clearly in Fig. 2.

As is well known, and as can be seen from the above, it is imperative that the pointer be restored to zero at the end of each demand period, after noting the reading of the dials, in order that the meter may function properly for the following demand period.

The main object of this invention is to assure the public utility or meter owner that the meter reader will restore the demand or reset pointer to zero as he should and when he should in order to prevent collusion between himself and the one to whom the service is furnished there being certain inherent defects in the demand register which permit of such which are well known and which will not be dwelt upon here. It will be described in detail later but briefly it is as follows: One in authority at the office of the meter owner issues to the meter reader a properly recorded and designated seal; which must be used to replace a similar seal already on the meter. The seal which is removed must be brought back to the office by the meter reader as evidence that it was actually removed. In removing the seal the mechanism as shown in Figs. 1 and 2 prevents the installation of the new seal or the resealing of the pointer reset lever until the reset lever has actually restored the demand or reset pointer to zero thus assuring that the meter is in a proper condition to record accurately the maximum demand for the next demand time period.

Referring again to the drawing, a detailed description of the device is as follows:

Fig. 1, B, is a watthour demand register having the well known kilowatt hour dials 2, 3, 4 and 5; kilowatt demand pointer 6, with its scale 7, and integrating, or it may be accumulative, kilowatt demand dials 8, 9 and 10, the operation of which by the meter is well known. 11 is a seal shown in detail in Figs. 3, 4 and 6, which is shown in position but not closed in Fig. 1, and is shown closed in Fig. 6, which is used to seal the demand pointer reset lever 12, to a fixed support 13, to prevent tampering by unauthorized persons. With the seal band removed from the slot 14 in reset lever 12 and slot 15 in support 13, reset lever 12 can be raised until it is above support 13, after which it can be rotated with element 16 to which it is fastened in such a manner that it cannot be removed without being subject to detection that such has been done. For example the pin 36 Fig. 1 on which it moves can be soldered in place and the whole of 16 and 12 chromium plated which would be a check on any removal of the pin. Cam 17 is also fastened to element 16 by means of a square hole in 17 fitting on a square shoulder on 16 and held taut against bushing or sleeve 20 by spring washer 19. The bushing 20, Fig. 2 is held in position in a hole in the glass cover 21 of the meter by a circular nut 22, the edge of which has ratchet teeth into which engages the pawl 23 permitting a counterclockwise rotation of lever 12 and axis 16 but preventing a clockwise rotation of the lever 12. To the cam 17 is fastened the arm 40 which revolves in a counterclockwise direction with the lever 12, and cam 17, engaging pointer 6 and restoring it to zero against the stop 24. This arm 40 is rigid enough to carry the pointer 6 back to zero but yet flexible enough to slide over the arm 6 at stop 24. In Fig. 2, seal screw bushing 25 is held in position in a hole in the glass cover 21 by means of a lock housing 26 which supports a seal screw lock plunger 27 and which plunger is moved up to the locking position by the spring 28 as the screw 31 of seal 11, Fig. 4, is being removed. The locking position is as shown in Fig. 2, the lock 29 having been pushed into the locking position by its spring 30 before screw 31 is entirely removed altho the view in Fig. 2 shows it entirely removed. The purpose of having plunger 27 follow up the screw 31 as it is being removed and go into the locking position as shown in Fig. 2 before it is possible to remove the screw 31 of seal 11 entirely, is to assure that a locking position will be obtained, which locking position can be released only by rotating lever 12 or cam 17, the cam during the rotation will push lock 29 back into its hole against the spring 30 permitting a new seal 11 with screw 31 to be screwed into bushing 25 holding down plunger 27 against its spring 28 and thereby again permitting of the sealing of reset lever 12 to support 13. While this operation took place arm 40 restored demand pointer 6 to zero accomplishing what was desired and with positive assurance.

The seal 11 with screw 31 which was removed is then taken back to the issuing office to the one authorized to receive it, who by its return will be assured that the meter from which it was taken has been set in a proper condition for the coming demand period.

Referring to Figs. 3, 4, and 6 on the drawing and merely to explain the seal more in detail; seal 11 consists of the strap 11 made of any well known material used for such purposes which has a hole 32 in one end which fits over lug 33 which lug is then depressed or flattened with a sealing tool forming a flat lug 35 in the end of which can be a depression or special marking of some character left by the sealing tool. The lug 34 is merely to hold the band 11 in position on screw 31 which together with lug 33 Fig. 3 or 4 prevents the screw 31 from being removed from the band 11. The band can have stamped on it any designating characters such as the meter owner's name, meter number, month of the demand period and year.

Referring again to the drawing:

Figs. 7, 8 and 9 show another form of the invention the operation of which is as follows: The seal 11 has a suitable slug 37, permanently attached to it which fits in a housing 38, in the glass cover 21. The slug 37 is of such length that it cannot be removed until the lever 12 has been raised and moved in a counterclockwise direction. The lever 12 can be raised only a certain fixed maximum distance, its movement being limited by stop 39 in the axis 41, preventing the removal of the seal 11, with attached slug 37, until the lever 12, has been rotated in a counterclockwise direction for some distance. The ratchet 22, with pawl 23, prevents a clockwise rotation, so in order to put the lever 12, in position to seal it again to support 13, it must be rotated counterclockwise all the way around, which operation restores pointer 6, to the zero position by means of arm 40, accomplishing the result desired.

While the invention has been illustrated in what are considered its best applications it may have other embodiments without departing from its spirit and is not therefore limited to the structures shown in the drawing.

What I claim is:

1. In an electric meter mechanism, the combination with a member having an initial position and taking up its position in accordance with the electric power demanded during the one of a plurality of successive equal times which is a maximum, such member being reset to its initial position at time intervals, means for resetting said member to its initial position, removable means for securing said resetting means, said resetting means when in initial position preventing removal of said removable means, said removable means being removable when said resetting means is removed from its initial position, and means for preventing the return of said resetting means to said initial position, after it has been removed therefrom, without moving to reset said member to its initial position.

2. In an electric meter mechanism the combination with a member having an initial position and taking up its position in accordance with the electric power demanded during one of a plurality of successive equal times which is a maximum, such member being reset to its initial position at time intervals, means for resetting said member to its initial position, a removable seal for securing said resetting means, said seal having a projection, said meter structure having a recess adapted to receive said projection and said projection lying in said recess when said seal is in securing position, said resetting means when in initial position preventing the removal of said projection from said recess, said projection being removable from said recess when said resetting means is removed from its initial position and means for preventing the return of said resetting means to said initial position after it has been removed therefrom without moving to reset said member to its initial position.

3. In an electric meter mechanism the combination with an indicating pointer having an initial position and taking up its position in accordance with the electric power demanded during one of a plurality of successive equal times which is a maximum, such member being reset to its initial position at time intervals, a pivoted arm for resetting said pointer to its initial position, a removable seal for securing said arm, said seal having a projection, said meter structure having a recess adapted to receive said projection and said projection lying in said recess when said seal is in securing position, said resetting arm when in initial position preventing the removal of said projection from said recess, said projection being removable from said recess when said resetting arm is removed from its initial position and means for preventing the return of said resetting arm to said initial position after it has been removed therefrom without moving to reset said pointer to its initial position.

WILLIAM C. NEIN.